US009277010B2

(12) United States Patent
Venkatesh et al.

(10) Patent No.: US 9,277,010 B2
(45) Date of Patent: Mar. 1, 2016

(54) SYSTEMS AND APPARATUSES FOR AGGREGATING NODES TO FORM AN AGGREGATED VIRTUAL STORAGE FOR A VIRTUALIZED DESKTOP ENVIRONMENT

(71) Applicant: Atlantis Computing, Inc., Mountain View, CA (US)

(72) Inventors: Chetan C Venkatesh, San Mateo, CA (US); Kartikeya Iyer, Campbell, CA (US)

(73) Assignee: Atlantis Computing, Inc., Mountain View, CA (US)

( * ) Notice: Subject to any disclaimer, the term of this patent is extended or adjusted under 35 U.S.C. 154(b) by 217 days.

(21) Appl. No.: 13/725,939

(22) Filed: Dec. 21, 2012

(65) Prior Publication Data

US 2014/0181236 A1  Jun. 26, 2014

(51) Int. Cl.
  *G06F 15/16* (2006.01)
  *H04L 29/08* (2006.01)
  *G06F 3/06* (2006.01)
  *G06F 11/20* (2006.01)

(52) U.S. Cl.
  CPC ............ *H04L 67/1097* (2013.01); *G06F 3/065* (2013.01); *G06F 3/067* (2013.01); *G06F 3/0608* (2013.01); *G06F 3/0614* (2013.01); *G06F 3/0641* (2013.01); *G06F 11/2094* (2013.01)

(58) Field of Classification Search
  None
  See application file for complete search history.

(56) References Cited

U.S. PATENT DOCUMENTS

| 4,603,380 | A | 7/1986 | Easton et al. |
|---|---|---|---|
| 6,675,214 | B2 | 1/2004 | Stewart et al. |
| 6,807,619 | B1 | 10/2004 | Ezra et al. |
| 6,915,302 | B1 | 7/2005 | Christofferson et al. |
| 7,269,608 | B2 | 9/2007 | Wong et al. |
| 7,356,651 | B2 | 4/2008 | Liu et al. |
| 7,571,288 | B2 | 8/2009 | Pudipeddi et al. |
| 7,908,436 | B1 | 3/2011 | Srinivasan et al. |
| 8,046,446 | B1 * | 10/2011 | Karr et al. ..................... 709/223 |
| 8,117,464 | B1 | 2/2012 | Kogelnik |
| 8,312,471 | B2 | 11/2012 | Davis |

(Continued)

OTHER PUBLICATIONS

PCT Notification of Transmittal of the International Search Report and the Written Opinion of the International Searching Authority, or the Declaration for PCT Application No. PCT/US2013/076683, 8 pgs. (May 23, 2014).

(Continued)

*Primary Examiner* — Mohamed Ibrahim
(74) *Attorney, Agent, or Firm* — Blakely, Sokoloff, Taylor & Zafman LLP

(57) ABSTRACT

Embodiments of the invention relate generally to software, data storage, and virtualized computing and processing resources. More specifically, systems and apparatuses are described for aggregating nodes to form an aggregated virtual storage for a virtualized desktop environment. In one embodiment, a virtual storage system includes servers including processors and memories, and an aggregated virtual storage including the memories, each of the memories being associated with a corresponding server. Also included is a storage aggregator processor coupled to a memory including executable instructions to generate a data structure for storage in each memory in an associated server in the servers, each of the data structures being configured to store a reference to duplicative data stored in a first number of servers in the servers. The duplicative data provides redundancy when a second number of servers, or fewer, in the servers are inaccessible.

19 Claims, 6 Drawing Sheets

(56) References Cited

U.S. PATENT DOCUMENTS

| | | | |
|---|---|---|---|
| 8,495,288 B2 | 7/2013 | Hosoya et al. | |
| 8,732,401 B2 | 5/2014 | Venkatesh et al. | |
| 2002/0124137 A1 | 9/2002 | Ulrich et al. | |
| 2003/0145045 A1* | 7/2003 | Pellegrino et al. | 709/203 |
| 2003/0188045 A1* | 10/2003 | Jacobson | 710/1 |
| 2004/0111443 A1 | 6/2004 | Wong et al. | |
| 2004/0128470 A1 | 7/2004 | Hetzler et al. | |
| 2005/0038850 A1 | 2/2005 | Oe et al. | |
| 2005/0108440 A1 | 5/2005 | Baumberger et al. | |
| 2005/0114595 A1 | 5/2005 | Karr et al. | |
| 2005/0131900 A1 | 6/2005 | Palliyll et al. | |
| 2006/0112251 A1 | 5/2006 | Karr et al. | |
| 2006/0272015 A1* | 11/2006 | Frank et al. | 726/15 |
| 2007/0005935 A1 | 1/2007 | Khosravi et al. | |
| 2007/0192534 A1 | 8/2007 | Hwang et al. | |
| 2007/0248029 A1 | 10/2007 | Merkey et al. | |
| 2007/0266037 A1 | 11/2007 | Terry et al. | |
| 2008/0183986 A1 | 7/2008 | Yehia et al. | |
| 2009/0063528 A1 | 3/2009 | Yueh | |
| 2009/0063795 A1* | 3/2009 | Yueh | 711/162 |
| 2009/0089337 A1 | 4/2009 | Perlin et al. | |
| 2009/0254507 A1 | 10/2009 | Hosoya et al. | |
| 2009/0319772 A1 | 12/2009 | Singh et al. | |
| 2010/0031000 A1 | 2/2010 | Flynn et al. | |
| 2010/0064166 A1 | 3/2010 | Dubnicki et al. | |
| 2010/0070725 A1 | 3/2010 | Prahlad et al. | |
| 2010/0180153 A1 | 7/2010 | Jernigan, IV et al. | |
| 2010/0181119 A1 | 7/2010 | Saigh et al. | |
| 2010/0188273 A1 | 7/2010 | He et al. | |
| 2010/0274772 A1 | 10/2010 | Samuels | |
| 2010/0306444 A1 | 12/2010 | Shirley et al. | |
| 2011/0035620 A1 | 2/2011 | Elyashev et al. | |
| 2011/0055471 A1 | 3/2011 | Thatcher et al. | |
| 2011/0071989 A1 | 3/2011 | Wilson et al. | |
| 2011/0082836 A1 | 4/2011 | Wang et al. | |
| 2011/0131390 A1 | 6/2011 | Srinivasan et al. | |
| 2011/0145243 A1 | 6/2011 | Yudenfriend | |
| 2011/0167045 A1 | 7/2011 | Okamoto | |
| 2011/0196900 A1 | 8/2011 | Drobychev et al. | |
| 2011/0265083 A1 | 10/2011 | Davis | |
| 2011/0276781 A1 | 11/2011 | Sengupta et al. | |
| 2011/0295914 A1 | 12/2011 | Mori | |
| 2012/0016845 A1 | 1/2012 | Bates | |
| 2012/0054445 A1 | 3/2012 | Swart et al. | |
| 2012/0137054 A1 | 5/2012 | Sadri et al. | |
| 2012/0159115 A1 | 6/2012 | Cha et al. | |
| 2012/0254131 A1 | 10/2012 | Al Kiswany et al. | |
| 2013/0013865 A1 | 1/2013 | Venkatesh et al. | |
| 2013/0117494 A1 | 5/2013 | Hughes et al. | |
| 2013/0124523 A1 | 5/2013 | Rogers et al. | |
| 2013/0166831 A1 | 6/2013 | Atkisson et al. | |
| 2013/0238876 A1 | 9/2013 | Fiske et al. | |
| 2013/0282627 A1 | 10/2013 | Faddoul et al. | |
| 2013/0283004 A1 | 10/2013 | Devine et al. | |

OTHER PUBLICATIONS

U.S. Appl. No. 13/269,525, Office Action, Mailed Jul. 26, 2013, 6 pages.
U.S. Appl. No. 13/269,525, Final Office Action, Mailed Jan. 2, 2014, 9 pages.
U.S. Appl. No. 13/269,525, Office Action, Mailed May 12, 2014, 8 pages.
PCT/US2013/076704, International Search Report and Written Opinion, Mailed Aug. 22, 2014.
U.S. Appl. No. 13/725,942, Office Action, Mailed Oct. 6, 2014, 7 pages.
U.S. Appl. No. 13/725,942, Notice of Allowance, Mailed Feb. 25, 2015, 8 pages.
U.S. Appl. No. 13/765,687, Office Action, Mailed Mar. 9, 2015, 21 pages.
U.S. Appl. No. 13/765,689, Office Action, Mailed Oct. 1, 2014, 9 pages.
U.S. Appl. No. 13/765,689, Final Office Action, Mailed Apr. 22, 2015, 12 pages.

* cited by examiner ions, according to some embodiments.

SYSTEMS AND APPARATUSES FOR AGGREGATING NODES TO FORM AN AGGREGATED VIRTUAL STORAGE FOR A VIRTUALIZED DESKTOP ENVIRONMENT

FIELD

Embodiments of the invention relate generally to software, data storage, and virtualized computing and processing resources. More specifically, systems and apparatuses are described for aggregating nodes to form an aggregated virtual storage for a virtualized desktop environment.

BACKGROUND

Virtualization is a technology that provides a software-based abstraction to a physical, hardware-based computer. In conventional solutions, an abstraction layer decouples physical hardware components (e.g., central processing unit ("CPU"), memory, disk drives, storage) from an operating system and allows numerous instances to be run side-by-side as virtual machines ("VMs") in isolation of each other. In conventional solutions, an operating system within a virtual machine has visibility into and can perform data transactions with a complete, consistent, and normalized set of hardware regardless of the actual individual physical hardware components underneath the software-based abstraction.

Virtual machines, in conventional solutions, are encapsulated as files (also referred to as images) making it possible to save, replay, edit and copy a virtual machine in a manner similar to that of handling a file on a file-system. This capability provides improved manageability, increased flexibility, and rapid administration relative to using physical machines to replace those that are abstracted.

However, virtual machines and conventional data storage implementations for the virtual machines suffer from significant shortcomings as VM files tend to be large in size and consume large amounts of disk space. Further, traditional data storage implementations typically include Storage Area Networks ("SANs"), Network Attached Storage ("NAS"), and the like. While functional, drawbacks to these storage technologies include optimizations for read accesses, while typically being ill-suited for write-intensive applications and operations. These traditional data storage require hardware and computing resources for implementing SAN-based or NAS-based storage, in addition to the computing resources and/or physical hardware components that provide the functionalities of the VMs.

Thus, what is needed is a solution for improving data storage for a virtualized desktop environment without the limitations of conventional techniques.

BRIEF DESCRIPTION OF THE DRAWINGS

Various embodiments of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. The described techniques may be varied and are not limited to the examples or descriptions provided.

Figure 1:
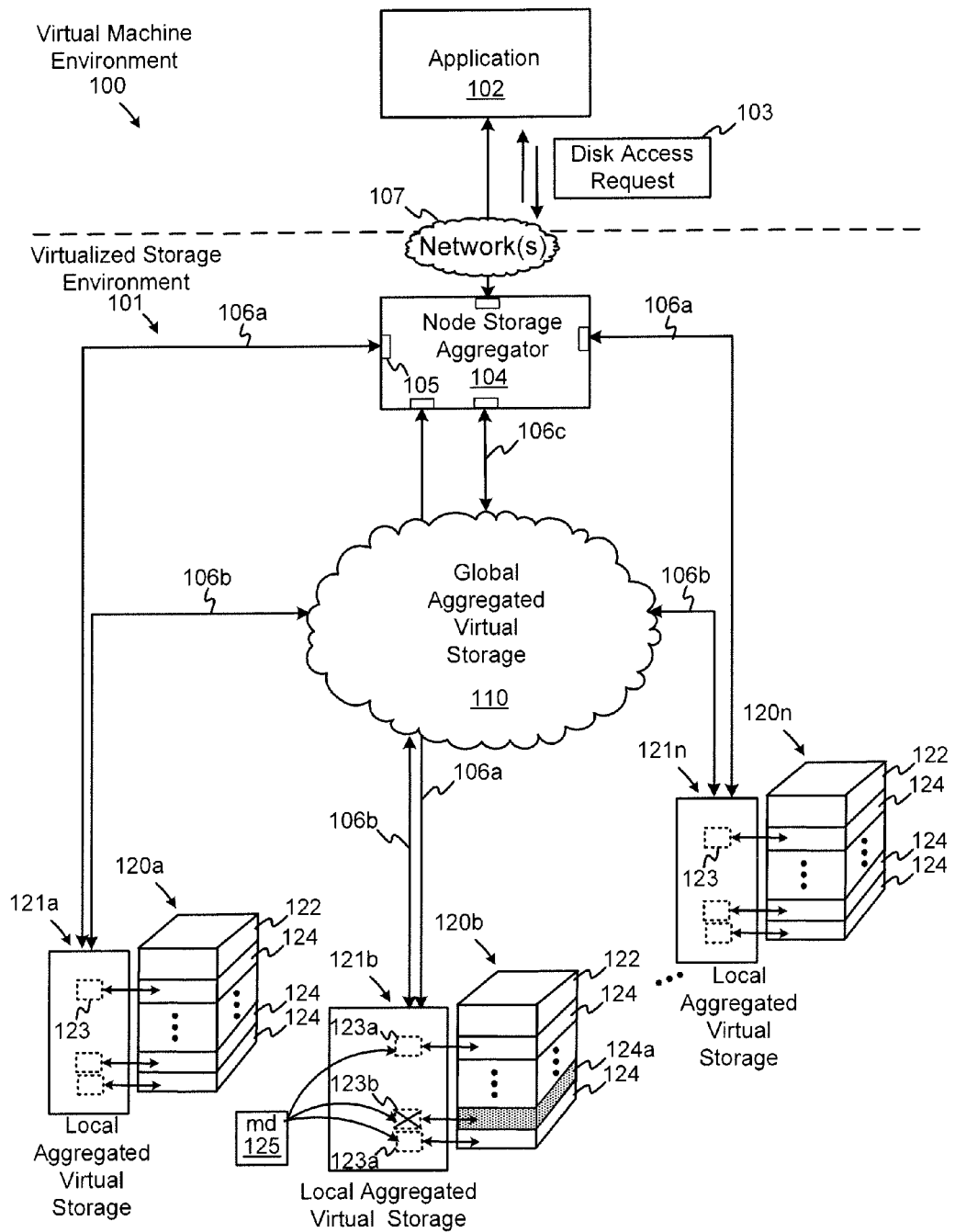
FIG. 1 illustrates an example of a virtual storage system for storing virtual machine files in association with a virtualized desktop environment, according to some embodiments.

FIG. 1 illustrates an example of a virtual storage system for storing virtual machine files in association with a virtualized desktop environment, according to some embodiments. FIG. 1 depicts a virtualized desktop environment as virtual machine environment 100, and instructions of an application 102 are executed in virtual machine environment 100 to generate disk access requests 103 to access data stored in a virtualized storage environment 101, disk access requests 103 including write operation requests and read operation requests, among others. Disk access request 103 can be communicated via one or more networks 107 to virtualized storage environment 101. In some examples, networks 107 can be implemented as any type of data network, including a local area network ("LAN"), wide area network ("WAN"), wireless local area network ("WLAN"), computing cloud, storage cloud, and others, without limitation. Further to the example shown, virtualized storage environment 101 includes a node storage aggregator 104 including various interfaces 105 configured to exchange data with storage facilities and/or services, and subsets 120a, 120b, and 120n of servers for providing such storage facilities and/or services. In some embodiments, subset 120a of servers is a server rack including networking devices and equipment 122 and rack-mounted servers 124. Similarly, subsets 120b and 120n of servers include networking devices and equipment 122 and rack-mounted servers 124. Servers 124 include one or more processors and one or more memories 123, which can include disk drives, solid state memory devices, or any other type of memory or storage devices.

Node storage aggregator 104 is configured to generate one or more aggregated virtual storage repositories. In one example, node storage aggregator 104 is configured to form aggregated virtual storage 121a (e.g., a local aggregated virtual storage) based on memories 123 of subset 120a of servers, whereas node storage aggregator 104 is configured to form aggregated virtual storage 121b and aggregated virtual storage 121n based on memories 123 of subset 120b of servers and subset 120n of servers, respectively. Node storage aggregator 104 is configured to access via paths 106a aggregated virtual storage 121a, 121b, and 121n. In an alternate example, node storage aggregator 104 is configured to form further aggregate aggregated virtual storage 121a, 121b, and 121n to form an aggregated virtual storage 110 (e.g., a global aggregated virtual storage). Node storage aggregator 104 is configured to access aggregated virtual storage 110 via path 106c, whereby aggregated virtual storage 110 includes aggregated virtual storage 121a, 121b, and 121n and accesses are via paths 106b to each aggregated virtual storage associated with a subset of servers. Further, node storage aggregator 104, which can include one or more storage aggregator processors coupled to a memory (not shown), can include executable instructions to generate a data structure 123a or 123b for storage in each memory in an associated server 124 in a subset of servers, such as subset 120b of servers. Each of the data structures 123a and 123b is configured to store a reference to duplicative data stored in a first number of servers in as subset 120b of servers. As used herein, the term "duplicative data" refers to copies of identical data, including the original data and copies thereof. In some embodiments, node storage aggregator 104 is configured to populate data structures 123a and 123b with identical metadata ("md") 125 and to disperse the data referenced by metadata 125 in each server 124 (a subset thereof) in subset 120b of servers.

In view of the foregoing, the structures and/or functionalities of virtualized storage environment 101 can facilitate implementation of aggregated virtual storage based on memories 123 of servers 124a disposed in, for example, server racks, thereby obviating the dependency on specialized storage technologies, such as SAN and NAS, to provide storage to virtual desktops and/or machines. Therefore, specialized hardware and/or software for implementing the specialized storage technologies need not be required. In some cases, the underlying physical hardware for implementing the virtual machines can be used to implement virtual storage in the aggregate. In accordance with various embodiments, the duplicative data provides data redundancy when a second number of servers, or fewer, in subset 120b of servers are inaccessible. Data redundancy is a general property or characteristic of disks or memories that specify a certain level of fault tolerance should one or more disks or memories fail. Further, the storing of identical metadata 125 preserves references to the duplicative data should servers 124 in subset 120b of servers fail. For example, consider that server 124a is off-line or is otherwise inaccessible (i.e., server 124a is non-responsive). Therefore, metadata 125 in data structure 123b is also inaccessible. In this case, node storage aggregator 104 access metadata 125 in other data structures 123a to determine references to the data being access (e.g., during a read operation), whereby the duplicative data is dispersed in responsive servers 124.

According to some embodiments, node storage aggregator 104 is configured to translate between disk memory access requests (and formats thereof) and access requests with the aggregated virtual storage (and formats thereof). Examples of disk memory access requests include, but are not limited to, requests to access a file in a root file system (e.g., accessing c:\\root\file.docx), which in turn, are related to access to a specific sector. As is discussed below, examples of access requests with the aggregated virtual storage include, but are not limited to, a sector number, identifiers of one or more nodes, a data representation of the data (e.g., a hash value), or other items of data. In some embodiments, subsets 120a, 120b, and 120n of servers each include a server rack and a number of housings in the server rack, each of which is configured to support one of servers 124. Also, subsets 120a, 120b, and 120n of servers each include a communications bus coupling each of servers 124 in subsets 120a, 120b, and 120n of servers to each other and to node storage aggregator 104. As used herein, the term "node" can refer to a collection of one or more processors and one or more memory devices, such as a server.

Figure 2:
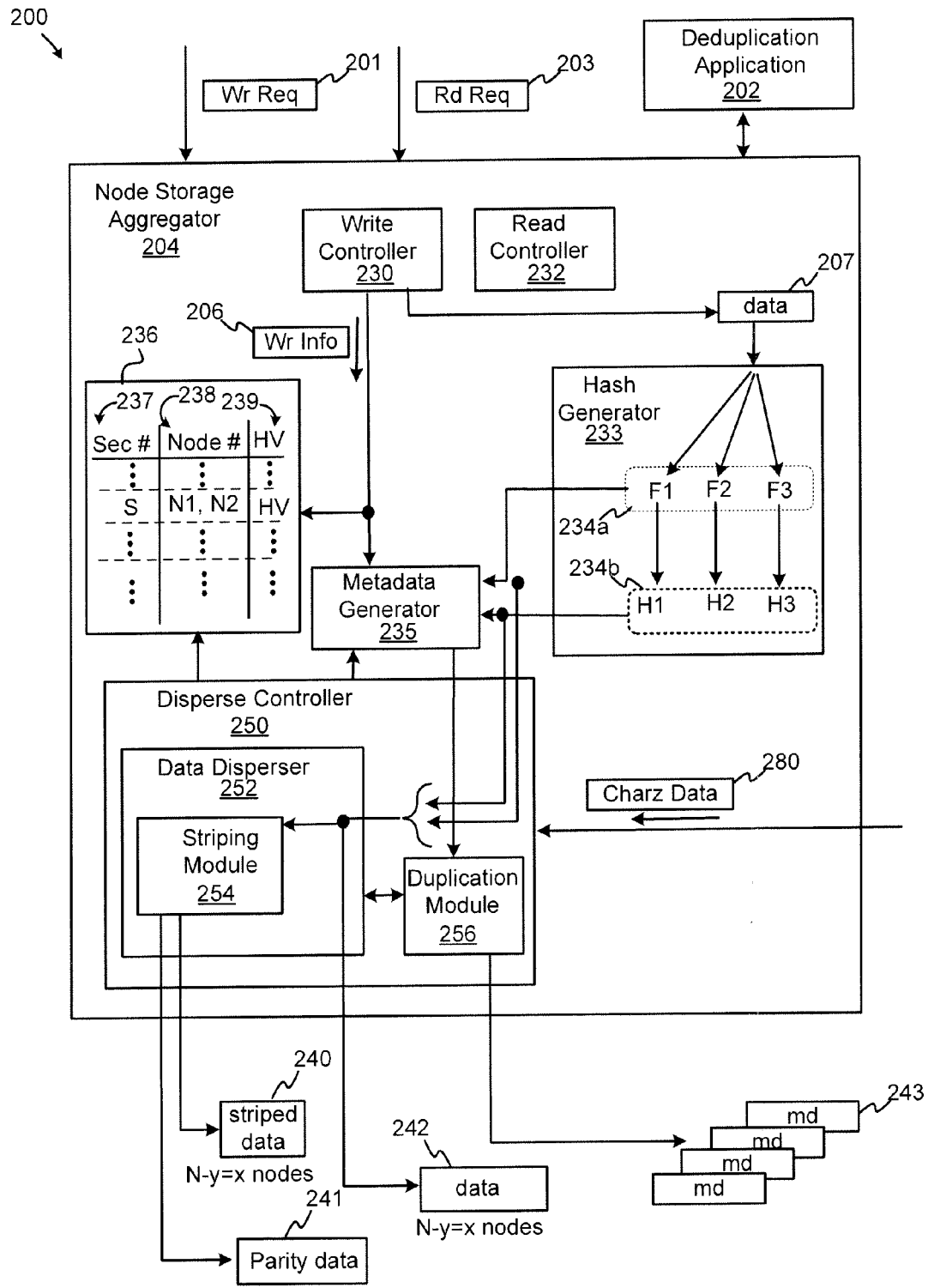
FIG. 2 illustrates an example of a node storage aggregator to assist the storing of virtual machine files in association with a virtualized desktop environment, according to some embodiments.

FIG. 2 illustrates an example of a node storage aggregator to assist the storing of virtual machine files in association with a virtualized desktop environment, according to some embodiments. Node storage aggregator 204 includes a write controller 230 configured to control write operations with an aggregated virtual storage, a read controller 232 configured to control read operations with the aggregated virtual storage, and a node write-repository 236 configured to store associations among data representing a sector number, a hash value, and one or more node identifiers, as will be explained below. Further, node storage aggregator 204 includes a hash generator configure to generate hash values for portions of data (i.e., fragments of data), a metadata generator configured to generate metadata, and a disperse controller 250 configured to disperse metadata and data, and optionally, parity data, among various nodes.

Write controller 230 is configured to receive a write request ("wr req") 201, from which write controller 230 extracts data 207 to be written and write information ("wr info") 206 including a sector number, "S," associated with the data. Hash generator 233 is configured to receive data, such as data to be written to aggregate virtual storage. The data is divided into portions of data as fragments 234a of data (e.g., F1, F2, and F3), each of which undergoes a hashing operations to generate hash values 234b (e.g., H1, H2, and H3) as key values. Examples of the hashing operation can include MD-5, SHA, and other like hash functions. In some embodiments, the hash values are "data representations" of the portions of data. But note that in some cases, the data itself can be "data representations" of the portions of data. Disperse controller 250 is configured to provide node identifiers to metadata generator 235, whereby the node identifiers specify the nodes to which duplicative data is to be stored. In some embodiments, the nodes (and the node identifiers) specify the optimal nodes as a function of capacity for specific nodes, access speed with the node, and other node access characteristics. For example, disperse controller 250 can receive node characteristic data ("charz") 280 specifying the attributes of the various nodes, and disperse controller 250 selects the node identifiers for the optimal nodes and presents those node identifiers to metadata generator 235. In some embodiments, a node identifier can be a MAC address, an IP address, or any other unique identifier. The portions of data (i.e., fragments) and/or the hash values can be sized to a 4 Kilobyte ("Kb") block.

Metadata generator 235 can use a data representation, such as a hash value, as a reference to duplicative data associated with a sector, along with one or more node identifiers that each identify a server in a first number of servers to which duplicative data is to be written. Metadata generator 235 then can generate metadata including the reference to the duplicative data and the node identifier. In operation, metadata generator 235 receives either portions (i.e., fragments 234a) of data or hash values for the portions of data, or both. Further, metadata generator 235 receives node identifiers to be written with duplicative data referenced by data representations (e.g., either the portion of data itself or the hash value). For each duplicative data referenced by a data representation, there is a corresponding set of one or more node identifiers. Each data representation is associated with the one or more node identifiers in a data structure, which is duplicated at duplication module 256 to generate multiple copies of metadata 243 to be stored in a data structure in each node (e.g., in a server rack).

Data disperser 252 is configured to generate duplicative data in cooperation with duplication module 256, and to disperse the duplicative data among a first number of nodes. The first number of nodes can be determined as a quantity, "x," of minimum number of responsive nodes to ensure data redundancy for a maximum quantity for the non-responsive nodes, "y," which constitutes the second number of nodes. In particular, "x" is calculated as follows: N−y=x, where N represents the total number of nodes in an aggregated virtual storage space. In the example of 5 total nodes, with no more than 2 nodes that are tolerated to be non-responsive, the duplicative data is written into 3 nodes. For example, data disperser can generate duplicative data 242 that is written to 3 nodes. In a specific embodiment, a striping module 254 is configured to stripe the data representation over the first number of node (e.g., 3 nodes, or 2 nodes with 1 node including parity data) to form striped data 240, and disperse parity data 241 over the subset of nodes or a portion thereof.

According to some embodiments, node storage aggregator 204 is configured to build and maintain node write-repository 236 that is configured to store associations among data representing a sector number ("Sec #") 237, a hash value ("HV"), and one or more node identifiers ("N1, N2"). In one example, node write-repository 236 is populated with sector number, S, from write information 206 when data 207 is to written to an aggregate virtual storage. A hash value ("HV") 234b is generated from a portion or fragment 234a of data and is stored in column 239 in association with sector number, S. Disperse controller 250 populates column 238 to include the node identifiers ("N1, N2") 238 in association with sector number, S, and hash value, HV. Thus, a read controller 232, responsive to a read request ("Rd Req") 203, can match metadata read out of the aggregate virtual storage against node write-repository 236 to identify alternative node identifiers (e.g., N2) if a node identifier (e.g., N1) is associated with a non-responsive node (e.g., the node is off-line). In some embodiments, deduplication application 202 can be implemented to remove duplicate (i.e., redundant) information in VM files in a read or write path between a virtual machine and an aggregated virtual storage. An example of deduplication application 202 is described in U.S. Non-Provisional patent application Ser. No. 13/269,525, filed Oct. 7, 2011, and entitled "Deduplication Of Virtual Machine Files In A Virtualized Desktop Environment."

Figure 3:
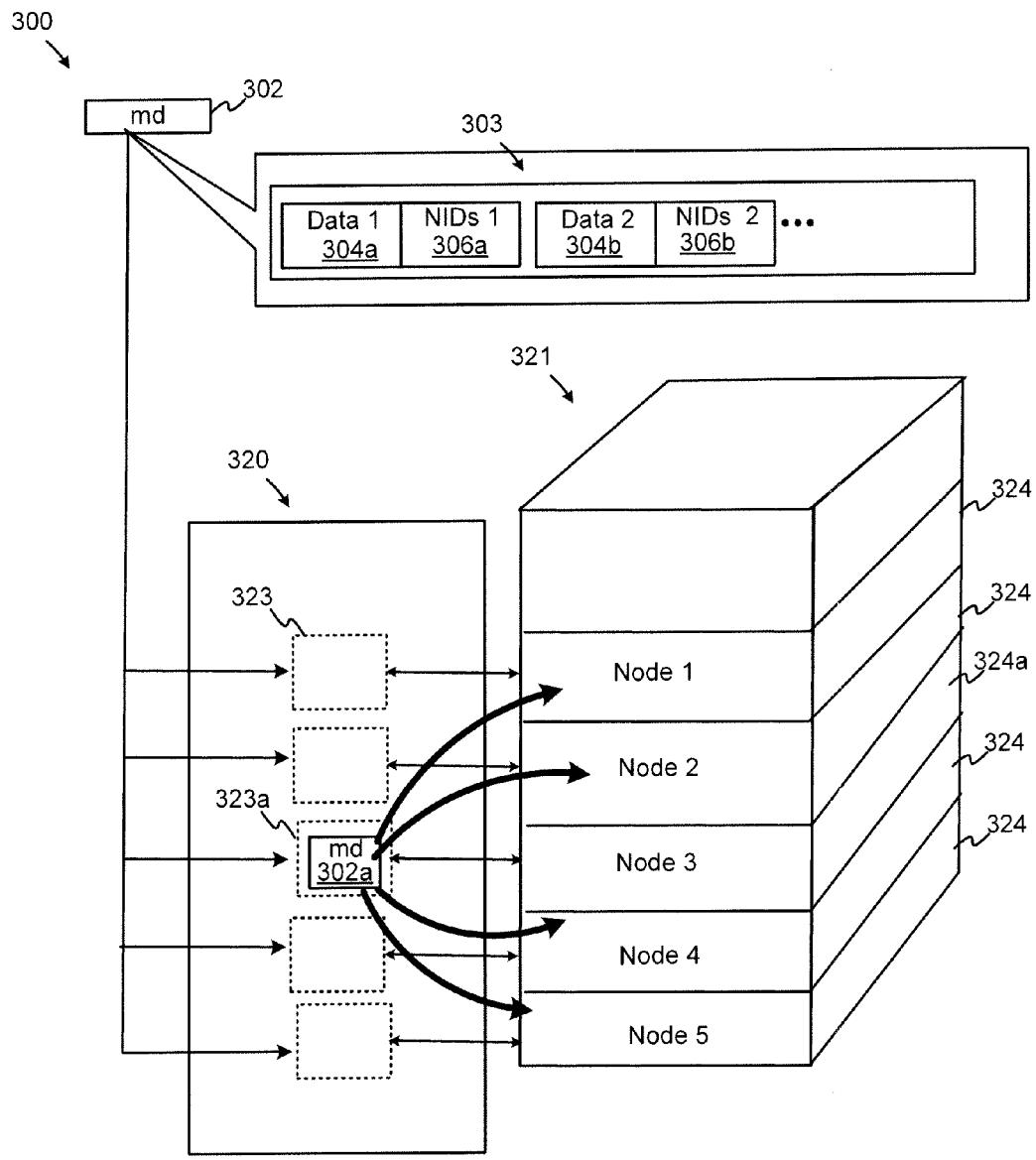
FIG. 3 depicts a data structure including metadata stored in memories constituting an aggregate virtual storage, according to some embodiments.

FIG. 3 depicts a data structure including metadata stored in memories constituting an aggregate virtual storage, according to some embodiments. Diagram 300 depicts metadata ("md") 302 including a data arrangement 303 composed of data representations ("Data 1") 304a and ("Data 2") 304b associated with node identifiers ("NIDs 1") 306a and ("NIDs 2") 306b, respectively, among others not shown. Each of data arrangements 303 are stored along with metadata 302 contained therein in data structures 323 of aggregated virtual storage 320 associated with a group 321 of servers 324. In this example, metadata 302 is stored as metadata 302a in data structure 323a associated with server ("3") 324a. Metadata 302a can include node identifiers as references duplicative data store in any other node (e.g., nodes 1 to nodes 5, optionally including node 3).

Figure 4:
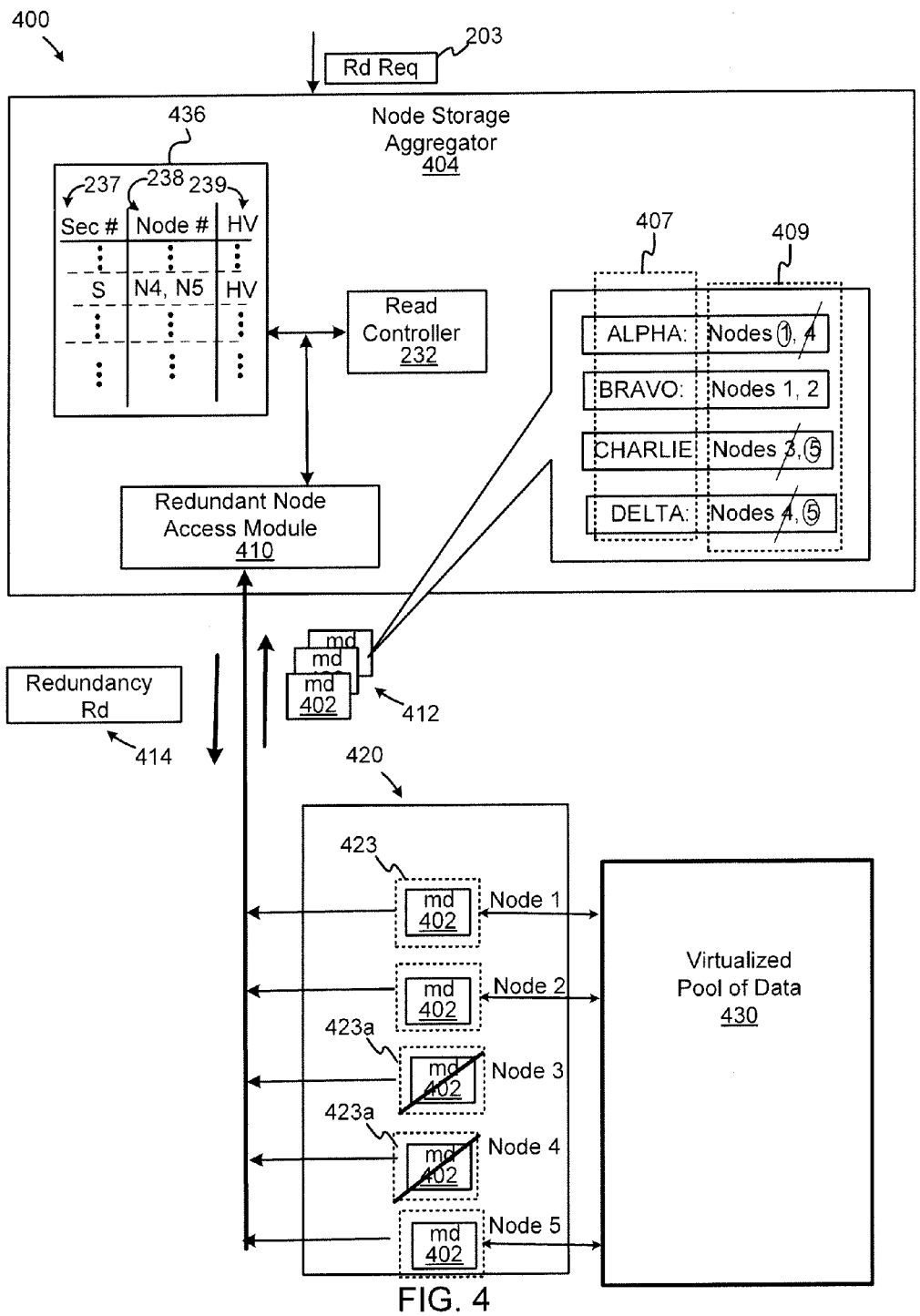
FIG. 4 depicts an example of a node storage aggregator for a virtualized desktop environment in which a subset of nodes are non-responsive, according to some embodiments.

FIG. 4 depicts an example of a node storage aggregator for a virtualized desktop environment in which a subset of nodes are non-responsive, according to some embodiments. Node storage aggregator 404 includes a node write-repository 436 composed of data representing sector numbers 237, node identifiers 238, and hash values 239, a read controller 232 and a redundant node access module 410. Redundant node access module 410 is configured to read metadata 402 in parallel from data structures 423 in each of the nodes, to determine non-responsive nodes (e.g., nodes 3 and 4) in the subset of nodes, and to extract at least one duplicate portion of the data from responsive nodes (e.g., nodes 1, 2, and 5) in the subset of nodes. Responsive nodes 1, 2, and 5 constitute a virtualized pool of data 430 that includes duplicative data as redundant data as nodes 3 and 4 are inaccessible. As such, metadata 402 cannot be read from data structures 423a. Responsive to a read request 203, read controller 232 causes redundant node access module 410 to read copies 412 of metadata 402 in parallel to determine the absence of metadata from nodes 3 and 4. Node storage aggregator 404 identifies instances in which the inaccessibility of nodes 3 and 4 affects the redundancy of specific portions of data, such as ALPHA, CHARLIE, and DELTA, each of which has lost duplicative data in either inaccessible node 3 or 4. Node storage aggregator 404 identifies the other node identifiers for accessing the data, such as node 1 for ALPHA, node 5 for CHARLIE and node 5 for DELTA. A redundancy read request to nodes 1 and 5 are made to extract ALPHA, CHARLIE and DELTA.

Figure 5:
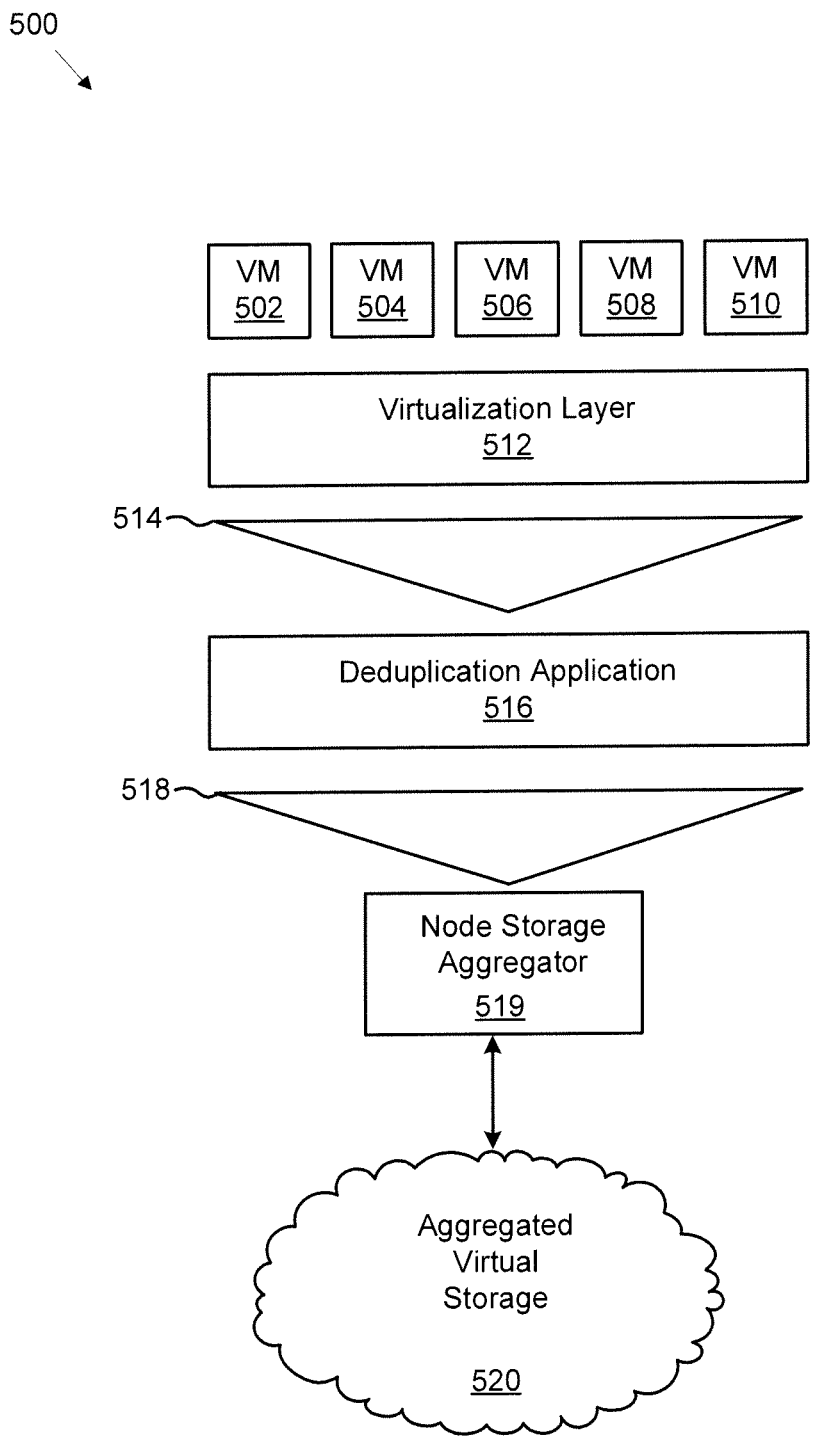
FIG. 5 illustrates an exemplary data path for real time accesses to virtual machine files stored in an aggregated virtual storage space for a virtualized desktop environment, according to some embodiments.

FIG. 5 illustrates an exemplary data path for real time accesses to virtual machine files stored in an aggregated virtual storage space for a virtualized desktop environment, according to some embodiments. Here, exemplary data path 400 includes VMs 502-510, virtualization layer 512, arrow 514 representing a data path portion, deduplication application 516, arrow 518 representing another data path portion, and primary storage 520. In some examples, VMs 502-510 may be implemented as desktop VMs using desktop operating systems such as Windows 7 or Windows XP running in a fully isolated environment and "side-by-side" (i.e., in parallel) on virtualization layer 512. In other example, VMs 502-510 can be implemented as a virtualized desktop environment running a desktop operating system (e.g., Windows XP or Windows 7 Enterprise as developed by Microsoft Corporation of Redmond, Wash.) on a virtualized hardware layer (such as those provided by VMWare or Citrix or Microsoft or Redhat). As used herein, virtualization layer 512 may be implemented as software that is configured to abstract the hardware of a server (e.g., x86 server, or others) allowing multiple isolated VMs (e.g., VMs 502-510) to run in isolation (i.e., full, partial, or complete) and side-by-side or in parallel (i.e., as a "hypervisor," virtual machine monitor ("VMM"), or the like). In some examples, deduplication application 516 may be implemented as described above in connection with FIG. 2, and is also part of data path 500. Network storage aggregator 519 is disposed on data path 500 to provide the structure and/or functionality described herein to generate, view, and access an aggregated virtual storage 520.

Figure 6:
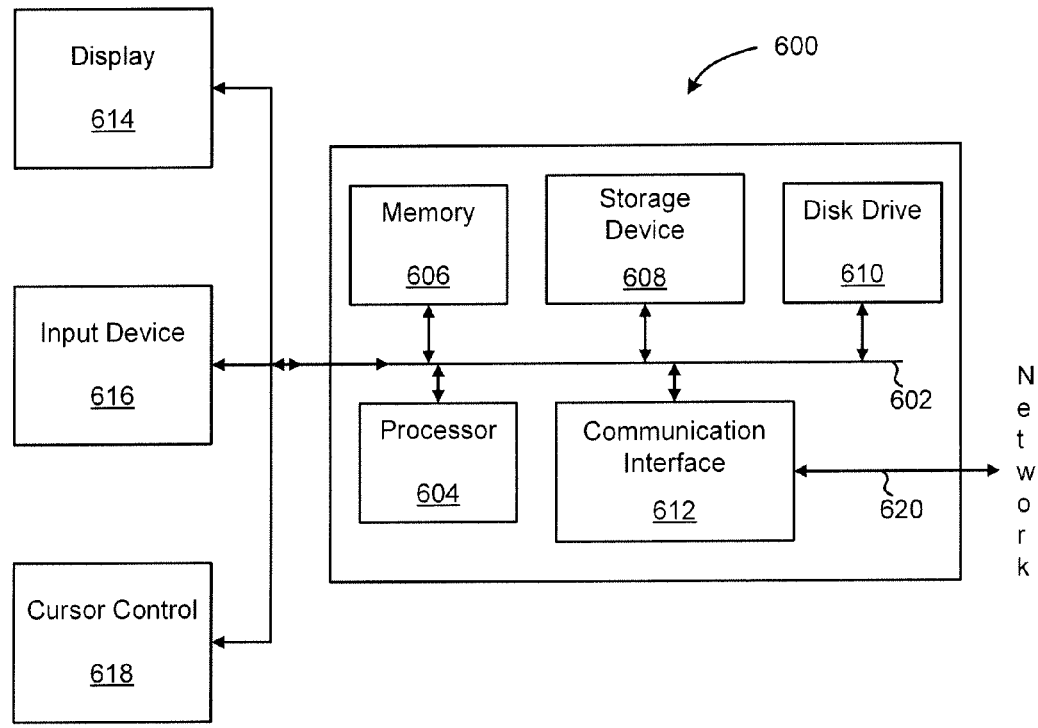
FIG. 6 illustrates an exemplary computer system suitable for implementing either a computing device including a storage aggregator processor or a node, or both.

FIG. 6 illustrates an exemplary computer system suitable for implementing either a computing device including a storage aggregator processor or a node, or both. In some examples, computer system 600 may be used to implement computer programs, applications, methods, processes, or other software to perform the above-described techniques. Or, computer system 600 can represent a server, such as a rack-mounted server disposed in a server rack (not shown). Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard, touch screen), and cursor control 618 (e.g., mouse, touch screen or trackball).

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, hard-wired circuitry may be used in place of or in combination with software instructions for implementation.

The term "computer readable medium" refers to any tangible medium that participates in providing instructions to processor 604 for execution. Such a medium may take many forms, including but not limited to, non-volatile media and volatile media. Non-volatile media includes, for example, optical or magnetic disks, such as disk drive 610. Volatile media includes dynamic memory, such as system memory 606.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 602 for transmitting a computer data signal.

In some examples, execution of the sequences of instructions may be performed by a single computer system 600. According to some examples, two or more computer systems 600, such as two or more nodes in a subset of nodes, can be coupled by communication link 620 (e.g., LAN, PSTN, or wireless network) to perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A virtual storage system comprising:
a subset of servers including a plurality of processors and a plurality of memories;
an aggregated virtual storage comprising the plurality of memories, each of the plurality of memories being associated with a corresponding server in the subset of servers; and
a storage aggregator processor coupled to a memory including executable instructions to disperse duplicative data comprising copies of original data by distributing the copies of original data and the original data among the subset of servers or a portion thereof, and generate a data structure for storage in each memory in an associated server in the subset of servers, each of the data structures being configured to store a reference to duplicative data stored in a first number of servers in the subset of servers, the memory further including executable instructions to translate between disk memory access requests and access requests with the aggregated virtual storage,
wherein the duplicative data provides redundancy when a second number of servers, or fewer, in the subset of servers are inaccessible.

2. The virtual storage system of claim 1, wherein the memory further comprises executable instructions to:
generate a data representation as the reference to the duplicative data associated with a sector,
identify a node identifier for each server of the first number of servers, and
generate metadata including the reference to the duplicative data and the node identifier.

3. The virtual storage system of claim 2, wherein the memory including the executable instructions to generate the data representation as the reference further comprise executable instructions to:
generate a hash value as the data representation.

4. The virtual storage system of claim 2, the memory including the executable instructions to disperse the duplicative data further comprise executable instructions to:
stripe the data representation over the first number of servers, and
disperse parity data over the subset of servers or a portion thereof.

5. The virtual storage system of claim 2, wherein the memory further comprises executable instructions to:
read metadata from the subset of servers in parallel;
determine that the second number of servers or fewer are inaccessible;
identify data representations having node identifiers associated with the second number of servers;
identify other node identifiers for the data representations; and
read the duplicative data for the data representations at the other node identifiers.

6. The virtual storage system of claim 1, wherein the subset of servers comprises:
- a server rack;
- a plurality of housings in the server rack, each of the housings configured to support one of the servers; and
- a communications bus coupling each of the servers in the subset of servers to each other and to the storage aggregator processor.

7. The virtual storage system of claim 1, wherein each of the plurality of memories comprise:
- one or more disks or solid state memory, or both.

8. The virtual storage system of claim 1, wherein the memory further comprises:
- executable instructions to populate the data structures with identical metadata.

9. A node storage aggregator comprising:
- interfaces configured to exchange data with nodes;
- a hash generator configured to generate a hash value for a portion of data;
- a metadata generator configured to generate data structures to store metadata in each of the nodes, the metadata including the hash value for the portion of data and node identifiers specifying a subset of nodes at which the portion of data is to be stored;
- a duplication module configured to generate duplicate portions of the data, and to store each of the duplicate portions of the data at each node in the subset of nodes; and
- a redundant node access module configured to read the metadata in parallel from each of the nodes, to determine non-responsive nodes in the subset of nodes, and to extract at least one duplicate portion of the data from responsive nodes in the subset of nodes.

10. The node storage aggregator of claim 9, further comprising:
- disperse controller configured to determine the subset of nodes, and to provide the node identifiers to the metadata generator; and
- a data disperser configured to disperse the duplicate portions of the data over the subset of nodes,
- wherein the disperse controller determines a quantity for the responsive nodes to ensure data redundancy for a maximum quantity for the non-responsive nodes.

11. The node storage aggregator of claim 10, wherein the disperse controller further comprises:
- a striping module configured to stripe the duplicate portions of the data over the subset of nodes.

12. The node storage aggregator of claim 11, wherein the striping module is further configured to:
- store parity data in each node of the subset of nodes.

13. The node storage aggregator of claim 9, wherein the subset of nodes constitute an aggregate virtual storage.

14. The node storage aggregator of claim 13, further comprising:
- a write controller configured to control write operations to the aggregate virtual storage, and to provide write information including a sector number; and
- a node write-read repository coupled to a disperse controller to receive the node identifiers, and configured to store associations among data representing the sector number, the hash value, and the node identifiers.

15. The node storage aggregator of claim 13, wherein the redundant node access module is further configured to analyze the metadata to detect a first node identifier associated with one of the non-responsive nodes relevant to the hash value, and to detect a second node identifier associated with one of the responsive nodes relevant to the hash value,
- wherein a redundancy read request is generated to retrieve one of the duplicate portions of the data.

16. A system including one or more processors and one or more memories, the system comprising:
- an aggregated virtual storage comprising subsets of memories in subsets of servers;
- a hypervisor comprising one or more computing devices including processors and memory including executable instructions configured to provide a virtualization layer for a plurality of virtual desktop machines;
- a deduplication application including executable instructions to deduplicate data received from a virtual desktop machine as the data is written to the aggregate virtual storage; and
- a node storage aggregator configured to disperse duplicative data comprising copies of original data by distributing the copies of original data and the original data among the subset of servers or a portion thereof, and generate a data structure for storage in each memory in a subset of memories in a subset of servers, each of the data structures being further configured to store a reference to duplicative data stored in a first number of servers in the subset of servers,
- wherein the duplicative data provides redundancy when a second number of servers in the subset of servers are inaccessible.

17. The system of claim 16, further comprising:
- a metadata generator configured to generate the data structures to include metadata in each memory in the subset of memories, the metadata including a hash value for duplicative data and node identifiers specifying the first number of servers at which the duplicative data are to be stored.

18. A method, comprising:
- exchanging data with nodes through interfaces of a node storage aggregator;
- generating, with a processor, a hash value for a portion of data;
- generating data structures to store metadata in each of the nodes, the metadata including the hash value for the portion of data and node identifiers specifying a subset of nodes at which the portion of data is to be stored;
- generating duplicate portions of the data;
- storing each of the duplicate portions of the data at each node in the subset of nodes; and
- reading the metadata in parallel from each of the nodes to determine non-responsive nodes in the subset of nodes, and to extract at least one duplicate portion of the data from responsive nodes in the subset of nodes.

19. The method of claim 18, further comprising:
- determining a minimum quantity of redundant nodes for the subset of nodes, to ensure data redundancy, as a total number of nodes less a maximum tolerated quantity of non-responsive nodes; and
- dispersing a number of duplicate portions of the data over the subset of nodes, the number corresponding to the minimum quantity.

* * * * *